United States Patent [19]

Kondoh et al.

[11] Patent Number: 5,255,212
[45] Date of Patent: Oct. 19, 1993

[54] METHOD OF PREDICTING A PHYSICAL QUANTITY OF A FLUID OR A MAGNETOFLUID

[75] Inventors: Yoshiomi Kondoh, Komagata-machi 694-3, Maebashi, Gunma 379-21; Takashi Yabe, Higashidai 1-5-3-604, Honjyo, Saitama 367; Jia-Ling Liang, Kiryu; Satarou Yamaguchi, Tokyo, all of Japan

[73] Assignees: Yoshiomi Kondoh, Gunma; Takashi Yabe, Saitama; Mitsubishi Denki Kabushiki Kaisha, Tokyo, all of Japan

[21] Appl. No.: 674,008

[22] Filed: Mar. 25, 1991

[30] Foreign Application Priority Data

Mar. 27, 1990 [JP] Japan .................................. 2-77659

[51] Int. Cl.$^5$ ...................... G06F 15/20; G06G 7/48
[52] U.S. Cl. .................................. 364/578; 364/510; 364/556
[58] Field of Search .............. 364/510, 556, 578, 148

[56] References Cited

U.S. PATENT DOCUMENTS

| | | | |
|---|---|---|---|
| 4,534,003 | 8/1985 | Manzione | 364/578 X |
| 4,809,202 | 2/1989 | Wolfram | 364/578 |
| 4,933,889 | 6/1990 | Meshkat et al. | 364/578 |
| 4,989,166 | 1/1991 | Akasaka et al. | 364/578 |
| 5,031,127 | 7/1991 | Fujita et al. | 364/578 X |
| 5,097,432 | 3/1992 | Harada et al. | 364/578 |
| 5,125,038 | 6/1992 | Meshkat et al. | 364/578 X |
| 5,148,379 | 9/1992 | Konno et al. | 364/578 |

OTHER PUBLICATIONS

Journal of the Physical Society of Japan, vol. 57, No. 8, Aug. 1988, pp. 2598-2601, A New Higher-Order Godunov Method for General Hyperbolic Equations, Takashi Yabe et al.

Primary Examiner—Kevin J. Teska
Attorney, Agent, or Firm—Sughrue, Mion, Zinn, Macpeak and Seas

[57] ABSTRACT

A method for calculating a physical flow quantity of a fluid or magnetofluid propagating over a surface such as in a wind tunnel. The method includes the steps of setting a main mesh having predetermined mesh spacing relative to space and time. The method sets a sub-mesh having a mesh spacing smaller than that of the main mesh in space regions between points in the main mesh, in which the magnitude of inclination of the physical quantity is above a first preset level. Next, the method sets mesh points, at which the magnitude of inclination of the physical quantity is greater than a second level that is greater than the first level, as singular points. Thereafter, the method calculates, via a CIP method, the values at the mesh points of the main mesh after an increment of time (a mesh spacing of the main mesh over the time variable). The values at the mesh points of the sub-mesh after the increment of time are also calculated via the CIP method. The variations of the physical quantity around the singular points are calculated, via approximate analytic function or delta function approximation. Next, the values at the main mesh points are corrected in view of the data obtained in the CIP and delta function approximation steps.

24 Claims, 2 Drawing Sheets

FIG. 1
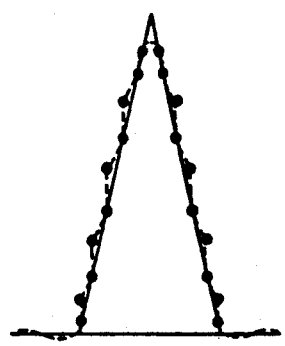
0.91584
FIG. 3(a)    FIG. 3(b)
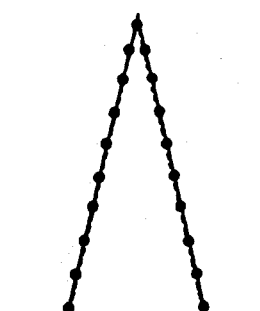 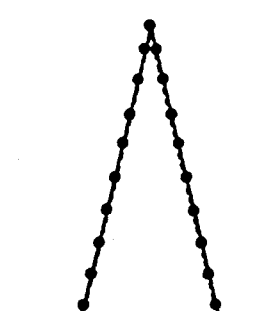
0.98122      0.99992

METHOD OF PREDICTING A PHYSICAL QUANTITY OF A FLUID OR A MAGNETOFLUID

BACKGROUND OF THE INVENTION

This invention relates to a method of predicting or calculating physical quantities of a fluid or a magnetofluid which are utilized in wind channel (air duct) experiments during product development of automobiles and airplanes, or in the control of injection molding processes of plastic resins.

A physical quantity f of a fluid or a magnetofluid which propagates through space at a velocity u is governed by the fundamental equation:

$$\partial f/\partial t + (u \cdot \nabla)f = 0 \tag{1}$$

where t is the time variable, and $\nabla$ is the nabla vector ($\partial/\partial x$, $\partial/\partial y$, $\partial/\partial z$). During product development of automobiles or airplanes, or in injection molding of plastics, it often becomes necessary to solve the above equation numerically and predict the time evolution of the spatial profile of a physical quantity f of a fluid or a magnetofluid from an initial spatial profile thereof. In the case where the velocity u is constant, the equation (1) can be solved analytically and there is no need for a numerical method of solution. However, when the velocity u is a function of the space variable ($u=u(x,y,z)$) and thus varies over the space, or is a function of space and time ($u=u(x,y,z,t)$) and thus varies over the space and time, there is no known general method of obtaining an analytic solution and hence it becomes necessary to solve the equation (1) approximately by means of a numerical method.

One such numerical method, known as the cubic-interpolated pseudoparticle (CIP) method, is disclosed, for example, in T. Yabe and E. Takei: "A New Higher-Order Godunov Method for General Hyperbolic Equations", Journal of Physical Society of Japan, Vol. 57, No. 8, August 1988, pp. 2598-2601, the disclosure of which article is incorporated herein by reference. According to the CIP method, a grid or mesh of a predetermined mesh spacing ($\Delta x$ and $\Delta t$) is set over the space and time, and the time evolution of the spatial profile of the physical quantity f is calculated numerically from the initial profile. At each step of repeated calculations, each evolution of the spatial profile of the physical quantity f over a very short time $\Delta t$ is calculated. By repeating a predetermined number of such calculations, the spatial profile of the physical quantity f after a predetermined interval of time can be obtained.

FIG. 1 shows a numerical solution (represented by a dotted curve) of one-dimensional non-attenuating triangular wave motion obtained by the CIP method disclosed in the above-mentioned article. The solution has been obtained after 1000 steps of repeated calculations of the time evolutions of the spatial profile of a triangular wave, each time step corresponding to the time increment $\Delta t$. For comparison, the solid curve represents the analytic or the true solution. The calculated or predicted height of the triangular wave profile is 0.91584, as opposed to the true height 1.0000 of the analytic solution. Thus, the prediction contains an error of about 8%. This result shows the fact that prediction precision suffers deterioration due to the numerical viscosity.

The generally adopted measure for enhancing the prediction precision of the numerical solution has been to reduce the mesh spacings and to increase the number of mesh points of the mesh or grid.

The above numerical method of solving the fundamental equation has the following disadvantage. If the number of mesh points is not large enough, the prediction precision tends to deteriorate in the region where the physical quantity f or the inclination thereof ($\partial f/\partial x$, $\partial f/\partial y$, $\partial f/\partial z$) varies abruptly and hence where the prediction errors tend to be generated due to the numerical viscosity. On the other hand, if the number of mesh points are increased to guarantee a precise solution, the time required for the calculation increases unduly.

SUMMARY OF THE INVENTION

It is therefore an object of this invention to provide a numerical method of solving an initial value problem of the fundamental equation (1), by which a precise solution can be obtained without undue increase in the time needed for completing the calculation.

The above object is accomplished in accordance with the principle of this invention by a numerical method of solving a fundamental differential equation for the propagation of a physical quantity, which comprises the steps of:

(a) setting a main mesh over a region of space and time, said main mesh consisting of mesh points separated from each other by predetermined mesh spacings over space and time, respectively;

(b) setting initial values of said physical quantity at mesh points of said main mesh over space;

(c) calculating magnitude of inclination of said physical quantity at each mesh point of said main mesh over space;

(d) setting a sub-mesh in regions of space where the magnitude of inclination of said physical quantity is greater than or at least equal to a first predetermined level, said sub-mesh consisting of mesh points over space and time separated from each other by mesh spacings smaller than the mesh spacings of said main mesh over space and time, respectively;

(e) designating as singular points those mesh points of the main mesh at which the magnitude of inclination of the physical quantity is greater than or at least equal to a second predetermined level which is greater than said first predetermined level;

(f) calculating, in accordance with a numerical method for solving said differential equation, values of said physical quantity at mesh points of said main mesh after an increment of time equal to the mesh spacing of the main mesh over time;

(g) calculating, in accordance with a numerical method for solving said differential equation, values of said physical quantity at mesh points of said sub-mesh after an increment of time equal to said mesh spacing of the main mesh over time;

(h) calculating variations of said physical quantity at mesh points of the main mesh that are designated as singular points in the step (e), by means of an approximate analytic function or delta function approximation;

(i) correcting values of said physical quantity at mesh points of said main mesh, obtained in the step (f), by means of corresponding data obtained in the steps (g) and (h); and (j) repeating the steps (c) through (i) for a predetermined number of time increments, thereby obtaining values of said physical quantity after a predetermined length of time after an initial time.

Preferably, the step (d) comprises the steps of:
(d1) classifying the magnitudes of inclination of said physical quantity at the mesh points of the main mesh into a plurality of ranks corresponding to magnitude levels of said physical quantity; and
(d2) setting a sub-mesh consisting of mesh points separated from each other by mesh spacings the magnitudes of which correspond to said ranks of the inclinations of the physical quantity.

BRIEF DESCRIPTION OF THE DRAWINGS

FIG. 1 shows the numerical solution obtained by a prior art CIP (cubic interpolated pseudo-particle) method;

FIG. 3(a) shows the solution of one-dimensional triangular wave motion obtained by a numerical method utilizing a part of the procedure that is characteristic of this invention; and FIG. 3(b) shows the solution of one-dimensional triangular wave motion obtained by a numerical method according to an embodiment of this invention.

DETAILED DESCRIPTION OF THE PREFERRED EMBODIMENT

Figure 2:
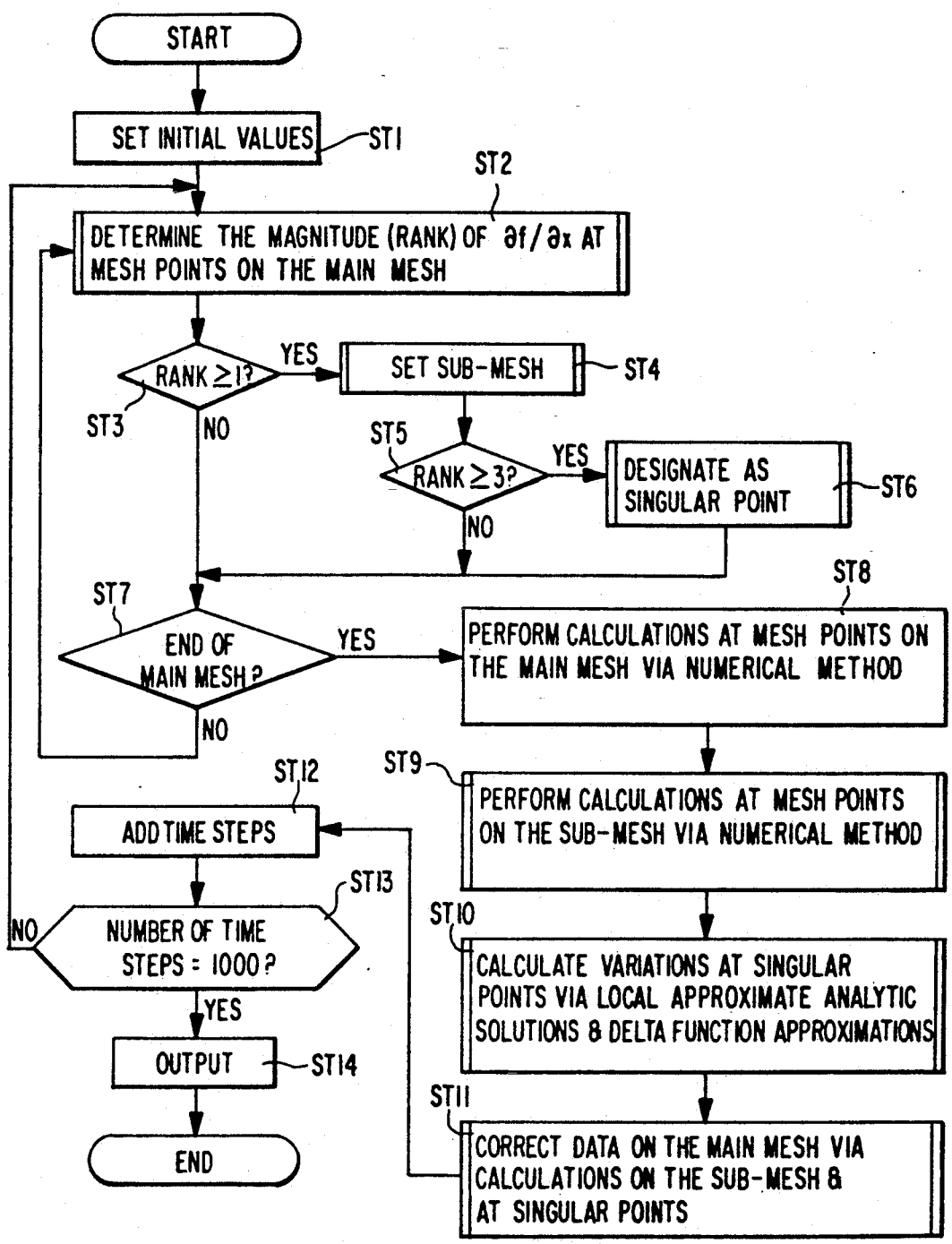
FIG. 2 is a flowchart showing the numerical method, according to an embodiment of this invention, of solving the fundamental equation governing the propagation of physical quantity of a fluid or magnetofluid.

FIG. 2 is a flowchart for explaining the method of calculating and predicting a physical quantity of a fluid or magnetofluid according to an embodiment of this invention. For simplicity, the following description is limited to the case of one-dimensional space, where the equation (1) for the three-dimensional space reduces to:

$$\partial f/\partial t + u(\partial f/\partial x) = 0 \qquad (1)'$$

However, the method can be generalized to the three-dimensional space without any difficulty, as can be apprehended by those skilled in the art.

First, at step ST1, the main scale mesh or grid of a predetermined mesh spacing ($\Delta x$ for the space variable x and $\Delta t$ for the time variable t) is set over a region of space and time, and the initial values at the main mesh points are set. Namely, the initial values at the respective main mesh points over the space at the initial time point (t=0) are set, and the initial spatial profile is approximated by interpolation. In the one-dimensional case, the main mesh over the space consists of mesh points $x_i$ separated from each other by a mesh spacing $\Delta x$. Thus, the initial values of f at the mesh points $x_i$ are given and the initial spatial profile of f between the mesh points is interpolated, for example, by a cubic polynomial.

At step ST2, the magnitude of the inclination of the physical quantity f (i.e., $\partial f/\partial x$) is calculated at each mesh point of the main mesh. At step ST3, the magnitude of the inclination of f at each main mesh point is compared with an arbitrarily selected level to determine whether or not it is greater than or at least equal to the first (i.e., the lowest) level. It is noted that the magnitude of the derivative of the inclination of the physical quantity (i.e., the second partial derivative of the physical quantity: $\partial^2 f/\partial x^2$) may be utilized instead of the magnitude of the inclination of the physical quantity, such that second derivatives of the physical quantity are compared with arbitrarily selected levels at subsequent steps ST3 and ST5. At step ST4, a sub-mesh having mesh spacings $\Delta x'$ and $\Delta t'$ smaller than those $\Delta x$ and $\Delta t$ of the main mesh is set in the space-time regions around or between the main mesh points where the magnitude or the rank of the inclination of the physical quantity f is greater than or at least equal to the first level.

Preferably, the mesh points of the sub-mesh are separated from each other by mesh spacings which correspond to the ranks or magnitudes of the inclination of the physical quantity. For example, in the region where the magnitude of inclination of the physical quantity f is in the rank 1 range (i.e., between the first and the second lowest levels), the mesh spacing of the sub-mesh is set at $\Delta t/2$ for the time variable t and $\Delta x/2$ for the space variable x; in the region where the magnitude of inclination of the physical quantity f is in the rank 2 range (i.e., between the second and the third lowest levels), the mesh spacing of the sub-mesh is set at $\Delta t/4$ for the time variable t and $\Delta x/4$ for the space variable x; and, generally, in the region where the magnitude of inclination of the physical quantity f is in the rank n range (i.e., between the n'th and the (n+1)th lowest level), the mesh spacing of the sub-mesh is set at $\Delta t/2^n$ for the time variable t and $\Delta x/2^n$ for the space variable x. In this embodiment, n is selected at two (n=2).

Further, at step ST5, the magnitude of the inclination of the physical quantity f at each main mesh point is compared with the third level. If it is greater than or at least equal to the third level (i.e., equal to or greater than the rank 3), the mesh point is designated as a singular point.

The steps ST2 through ST6 are effected for each main mesh point over the space region. When it is determined at step ST7 that the steps ST2 through ST6 have been performed for all of the main mesh points, the equation (1)' (or (1)) is solved numerically at the main mesh points at step ST8. Thus, at step ST8, the values at the main mesh points over the space after a short interval of time $\Delta t$ are obtained by a numerical method such as CIP method. Further, at step ST9, the equation (1)' (or (1)) is solved numerically at the sub-mesh points, which are set in step ST4. Thus, the values at the sub-mesh points over the space after a short interval of time $\Delta t$ are obtained by the numerical method. Furthermore, at step ST10, the variations of the physical quantity f at the main mesh points, which have been designated as singular points at step ST6, are calculated by means of approximate analytic solutions and (Dirac's) delta function approximations. At step ST11, the values or data calculated at main mesh points are corrected utilizing the data calculated at the corresponding mesh points on the sub-mesh and the corresponding singular points obtained at step ST9 and step ST10.

Thus, after a cycle of steps ST8 through ST11 is completed, a numerical solution of the equation (1)' or (1) at the main mesh points after a short interval of time $\Delta t$ is obtained and a new spatial profile of the physical quantity is interpolated. At step ST12, the count of the time steps (i.e., the number of time increments $\Delta t$) is incremented by one, and at step ST13 it is judged whether the count or the number of time steps has reached a predetermined number (which is equal to 1000 in this embodiment), such that the above cycle ST2 through ST12 is repeated for the predetermined number of time steps. At step ST14, the values (or the spatial profile) of the physical quantity f after a predetermined length of time (equal to 1000 times the time increment Δt) after the initial time point (t=0) are obtained.

In the above method of calculation, two procedures are characteristic of this invention: (A) the steps ST3, ST4, and ST9 for setting the sub-mesh and effecting numerical calculations thereat, and (B) the steps ST5, ST6, and ST10 for designating the singular points and effecting approximations thereat by means of analytic or delta functions. The calculations at the step ST8 and the step ST9 can be performed in accordance with the method described in the above mentioned article.

FIG. 3 show solutions (represented by dotted curves) of one-dimensional non-attenuating triangular wave motion (which is described by the equation (1)' above, where the velocity u is a constant) after calculations of 1000 time steps. FIG. 3(a) shows the solution obtained by the CIP method with the help of the above mentioned procedure (A) alone, while FIG. 3(b) shows the solution obtained in accordance with the present invention (i.e., by the CIP method with the help of both the above characteristic procedures (A) and (B)). In the case of FIG. 3(a), the predicted height of the triangular wave is 0.98122, compared with the true height of the analytic solution represented by a solid curve, and the prediction error is thus about 2%. In the case of FIG. 3(b), the predicted height of the triangular wave is 0.99992, such that the prediction error is not greater than 0.01%, which is a marked improvement.

It is noted that in the case of the triangular waves shown in FIG. 3, the sub-mesh is set only at the three vertices of the triangle in accordance with the procedure of this invention. Thus, there is no undue increase in the time required for the calculation. On the other hand, the precision of the prediction shows marked improvement.

What is claimed is:

1. A method of calculating a flow rate of a fluid propagating through a wind channel at a predetermined velocity, wherein said velocity varies at different points within said wind channel, said method comprising the steps of:
   (a) setting a main mesh over a region of said wind channel, said main mesh comprising mesh points separated by predetermined mesh spacings with respect to space and time;
   (b) setting initial values of said flow rate at each of said mesh points of said main mesh space in said wind channel;
   (c) calculating a magnitude of inclination of said flow rate at each mesh point of said main mesh;
   (d) setting a sub-mesh in regions of said wind channel where the magnitude of inclination of said flow rate is greater than or equal to a first predetermined level, said sub-mesh comprising mesh points positioned with respect to space and time and separated from each other by mesh spacings smaller than the mesh spacings of said main mesh;
   (e) designating, as singular points, mesh points of the main mesh at which the magnitude of inclination of the flow rate through the wind channel is greater than or equal to a second predetermined level which is greater than said first predetermined level;
   (f) calculating values of said flow rate at mesh points of said main mesh after a desired increment of time;
   (g) calculating values of said flow rate at mesh points of said sub-mesh after said desired increment of time;
   (h) calculating variations of said flow rate at mesh points of the main mesh that are designated as singular points in step (e), by one of an approximate analytic function and a delta function approximation;
   (i) correcting values of said flow rate at mesh points of said main mesh, obtained in step (f), based on data obtained in steps (g) and (h); and
   (j) repeating steps (c) through (i) for a predetermined number of time increments to obtain values of said flow rate through said wind channel after a predetermined length of time.

2. A method of calculating a physical quantity of a fluid as claimed in claim 1, wherein said physical quantity propagates over space by a velocity governed by said predetermined differential equation.

3. A method of calculating a physical quantity of a fluid as claimed in claim 1, wherein said step (d) comprises the steps of:
   (d1) classifying the magnitudes of inclination of said physical quantity at the mesh points of the main mesh into a plurality of ranks corresponding to magnitude levels of said physical quantity; and
   (d2) setting a sub-mesh consisting of mesh points separated from each other by mesh spacings the magnitudes of which correspond to said ranks of the inclinations of the physical quantity.

4. A method of calculating a physical quantity of a fluid according to claim 1, wherein said numerical method utilized in the steps (f) and (g) is a cubic interpolation pseudo-particle method.

5. The method according to claim 1, wherein said flow rate of said fluid propagates based on the following predetermined differential equation:

$$\partial f/\partial t+(u\cdot\nabla)f=0;$$

where t is a time variable, and where $\nabla$ is the nabla vector $(\partial/\partial x, \partial/\partial y, \partial/\partial z)$.

6. A method according to claim 1, wherein said step of setting a sub-mesh further comprises the steps of:
   ranking the magnitudes of inclination at each sub-mesh point in the wind channel based on the magnitudes thereof; and
   setting the sub-mesh spacing at Δt/n for a time variable and Δx/2 for a space variable, where Δt represents said desired increment of time, Δx represents said predetermined special mesh spacing between said main mesh points and n represents a ranking of said magnitude of inclination.

7. The method according to claim 1, wherein said flow rate of said fluid propagates based on the following predetermined differential equation:

$$\partial f/\partial t+(u\cdot\nabla)f=0;$$

where t is a time variable, and where $\nabla$ is the nabla vector $(\partial/\partial x, \partial/\partial y, \partial/\partial z)$.

8. A method according to claim 1, wherein said step of setting a sub-mesh further comprises the steps of:
   ranking the magnitudes of inclination at each sub-mesh point in the injection mold based on the magnitudes thereof; and
   setting the sub-mesh spacing at Δt/n for a time variable and Δx/2 for a space variable, where Δt represents said desired increment of time, Δx represents said predetermined special mesh spacing between said main mesh points and n represents a ranking of said magnitude of inclination.

9. An apparatus for calculating a flow rate of a fluid which propagates through a wind tunnel of the type used when developing automobiles and aircraft, said fluid propagating through said wind tunnel at a predetermined velocity which varies at different points within said wind tunnel, said apparatus comprising:
- means for initializing a main mesh within said wind tunnel which extends in directions parallel and perpendicular to a propagating direction of said fluid, said main mesh comprising mesh points separated by spatial and time mesh spacings;
- means for initializing values of said mesh points representing said flow rate at each mesh point in the wind tunnel at an initial point in time;
- initial means for calculating a rate of change of said flow rate at each mesh point in the wind tunnel at said initial time;
- means for setting a sub-mesh within regions of said wind tunnel and between said main mesh points at which the rate of change of said flow rate is greater than or equal to a first predetermined level, said sub-mesh comprising sub-mesh points separated by mesh spacings smaller than the mesh spacings of said main mesh;
- means for designating, as singular points, main mesh points in the wind tunnel at which said rate of change of the flow rate is greater than or equal to a second predetermined level which is greater than said first predetermined level, said designating means identifying singular points of said main mesh based on one of an approximate analytic function and a delta function approximation;
- first means for calculating values of the flow rate at main mesh points after a desired increment of time;
- second means for calculating values of the flow rate at sub-mesh points after said desired increment of time;
- third means for calculating variations in said flow rate at said singular points;
- means for correcting values of said flow rate at main mesh points in the wind tunnel, obtained by said first calculating means, based on data obtained by said second and third calculating means, in order to obtain, after a predetermined number of time increments, predicted values of said flow rate throughout the wind tunnel.

10. An apparatus according to claim 9, wherein said flow rate changes over space within said wind tunnel based on a predetermined differential equation.

11. An apparatus according to claim 9, wherein said means for setting said sub-mesh region further comprises:
- means for ranking the rates of change of said flow rate at the main mesh points of the wind tunnel into a plurality of ranks corresponding to magnitude levels of said flow rate; and
- means for setting a spacing between said sub-mesh points, the magnitude of which correspond to a rank of the rate of change of the corresponding flow rate.

12. An apparatus according to claim 9, wherein said first and second calculating means use a cubic interpolation pseudo-particle method for calculating said values of said flow rate.

13. An apparatus according to claim 9, wherein said flow rate of said fluid propagates based on the following predetermined differential equation:

$$\partial f/\partial t + (u \cdot \nabla)f = 0;$$

where t is a time variable, and where v is the nabla vector $(\partial/\partial x, \partial/\partial y, \partial/\partial z)$.

14. An apparatus according to claim 9, wherein said means for setting a sub-mesh further comprises:
- means for ranking the magnitudes of inclination at each sub-mesh point based on the magnitudes thereof; and
- means for setting the sub-mesh spacing at $\Delta t/n$ for a time variable and $\Delta x/2$ for a space variable, where $\Delta t$ represents said desired increment of time, $\Delta x$ represents said predetermined special mesh spacing between said main mesh points and n represents a ranking of said magnitude of inclination.

15. An apparatus according to claim 9, wherein said flow rate changes over space within said injection mold based on a predetermined differential equation.

16. An apparatus according to claim 9, wherein said means for setting said sub-mesh region further comprises:
- means for ranking the rates of change of said flow rate at the main mesh points of the injection mold into a plurality of ranks corresponding to magnitude levels of said flow rate; and
- means for setting a spacing between said sub-mesh points, the magnitude of which correspond to a rank of the rate of change of the corresponding flow rate.

17. An apparatus according to claim 9, wherein said first and second calculating means use a cubic interpolation pseudo-particle method for calculating said values of said flow rate.

18. An apparatus according to claim 9, wherein said flow rate of said fluid propagates based on the following predetermined differential equation:

$$\partial f/\partial t + (u \cdot \nabla)f = 0;$$

where t is a time variable, and where $\nabla$ is the nabla vector $(\partial/\partial x, \partial/\partial y, \partial/\partial z)$.

19. An apparatus according to claim 9, wherein said means for setting a sub-mesh further comprises:
- means for ranking the magnitudes of inclination at each sub-mesh point based on the magnitudes thereof; and
- means for setting the sub-mesh spacing at $\Delta t/n$ for a time variable and $\Delta x/2$ for a space variable, where $\Delta t$ represents said desired increment of time, $\Delta x$ represents said predetermined special mesh spacing between said main mesh points and n represents a ranking of said magnitude of inclination.

20. A method of calculating a flow rate of a fluid propagating through an injection mold at a predetermined velocity, wherein said velocity varies at different points within said injection mold, said method comprising the steps of:
(a) setting a main mesh over a region of said injection mold, said main mesh comprising mesh points separated by predetermined mesh spacings with respect to space and time;
(b) setting initial values of said flow rate at each of said mesh points of said main mesh space in said injection mold;

(c) calculating a magnitude of inclination of said flow rate at each mesh point of said main mesh;

(d) setting a sub-mesh in regions of said injection mold where the magnitude of inclination of said flow rate is greater than or equal to a first predetermined level, said sub-mesh comprising mesh points positioned with respect to space and time and separated from each other by mesh spacings smaller than the mesh spacings of said main mesh;

(e) designating, as singular points, mesh points of the main mesh at which the magnitude of inclination of the flow rate through the injection mold is greater than or equal to a second predetermined level which is greater than said first predetermined level;

(f) calculating values of said flow rate at mesh points of said main mesh after a desired increment of time;

(g) calculating values of said flow rate at mesh points of said sub-mesh after said desired increment of time;

(h) calculating variations of said flow rate at mesh points of the main mesh that are designated as singular points in step (e), by one of an approximate analytic function and a delta function approximation;

(i) correcting values of said flow rate at mesh points of said main mesh, obtained in step (f), based on data obtained in steps (g) and (h); and (j) repeating steps (c) through (i) for a predetermined number of time increments to obtain values of said flow rate through said injection mold after a predetermined length of time.

21. A method of calculating a physical quantity of a fluid as claimed in claim 20, wherein said flow rate propagates over space by a velocity governed by said predetermined differential equation.

22. A method of calculating a physical quantity of a fluid as claimed in claim 20, wherein said step (d) comprises the steps of:

(d1) classifying the magnitudes of inclination of said flow rate at the mesh points of the main mesh into a plurality of ranks corresponding to magnitude levels of said physical quantity; and (d2) setting a sub-mesh spacings the magnitudes of which correspond to said ranks of the inclinations of the flow rate.

23. A method of calculating a physical quantity of a fluid according to claim 20, wherein said numerical method utilized in the steps (f) and (g) is a cubic interpolation pseudo-particle method.

24. An apparatus for calculating a flow rate of a fluid which propagates through an injection mold of the type used when processing plastic resins, said fluid propagating through said injection mold at a predetermined velocity which varies at different points within said injection mold, said apparatus comprising:

means for initializing a main mesh within said injection mold which extends in directions parallel and perpendicular to a propagating direction of said fluid, said main mesh comprising mesh points separated by spatial and time mesh spacings;

means for initializing values of said mesh points representing said flow rate at each mesh point in the injection mold at an initial point in time;

initial means for calculating a rate of change of said flow rate at each mesh point in the injection mold at said initial time;

means for setting a sub-mesh within regions of said injection mold and between said main mesh points at which the rate of change of said flow rate is greater than or equal to a first predetermined level, said sub-mesh comprising sub-mesh points separated by mesh spacings smaller than the mesh spacings of said main mesh;

means for designating, as singular points, main mesh points in the injection mold at which said rate of change of the flow rate is greater than or equal to a second predetermined level which is greater than said first predetermined level, said designating means identifying singular points of said main mesh based on one of an approximate analytic function and a delta function approximation;

first means for calculating values of the flow rate at main mesh points after a desired increment of time;

second means for calculating values of the flow rate at sub-mesh points after said desired increment of time;

third means for calculating variations in said flow rate at said singular points;

means for correcting values of said flow rate at main mesh points in the injection mold, obtained by said first calculating means, based on data obtained by said second and third calculating means, in order to obtain, after a predetermined number of time increments, predicted values of said flow rate throughout the injection mold.

* * * * *